United States Patent
Dahlman et al.

(10) Patent No.: US 10,390,330 B2
(45) Date of Patent: Aug. 20, 2019

(54) METHODS, WIRELESS DEVICE, RADIO BASE STATION AND SECOND NETWORK NODE FOR MANAGING EPS BEARER

(71) Applicant: Telefonaktiebolaget LM Ericsson (publ), Stockholm (SE)

(72) Inventors: Erik Dahlman, Stockholm (SE); Magnus Frodigh, Sollentuna (SE); Mikael Höök, Sollentuna (SE); Harald Kallin, Sollentuna (SE); Gunnar Mildh, Sollentuna (SE); Joachim Sachs, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 53 days.

(21) Appl. No.: 15/122,956

(22) PCT Filed: Mar. 4, 2014

(86) PCT No.: PCT/SE2014/050263
§ 371 (c)(1),
(2) Date: Sep. 1, 2016

(87) PCT Pub. No.: WO2015/133945
PCT Pub. Date: Sep. 11, 2015

(65) Prior Publication Data
US 2017/0070977 A1    Mar. 9, 2017

(51) Int. Cl.
*H04W 72/04* (2009.01)
*H04W 76/12* (2018.01)
(Continued)

(52) U.S. Cl.
CPC ......... *H04W 72/04* (2013.01); *H04L 41/5009* (2013.01); *H04L 41/5051* (2013.01);
(Continued)

(58) Field of Classification Search
None
See application file for complete search history.

(56) References Cited

U.S. PATENT DOCUMENTS

2006/0291580 A1    12/2006    Horvitz
2007/0115843 A1*    5/2007    Bader ................... H04L 47/724
                                                           370/252
(Continued)

FOREIGN PATENT DOCUMENTS

CN    102223672 A    10/2011
CN    102857897 A    1/2013
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0 (Dec. 2013), Dec. 2013, 1-349.

(Continued)

*Primary Examiner* — Mohamed A Kamara
*Assistant Examiner* — Isaad Khawar
(74) *Attorney, Agent, or Firm* — Murphy, Bilak & Hommiller, PLLC

(57) ABSTRACT

A method and a wireless device (110) for managing an EPS bearer, a method and a radio base station (120) for setting parameters of an S1 bearer or an Iu bearer as well as a method and a second network node (150) for managing an EPS bearer are disclosed. The wireless device (110) sends, to the second network node (150), a request for setting up the EPS bearer for a service. The request is associated with a required level of a connectivity for the service. The required level relates to likelihood of maintaining the connectivity towards a first network node (140). The second network node (150) further receives the required level of the con- (Continued)

nectivity for the service. The second network node (150) sends, to a radio base station (120), a request for setting parameters of the S1 bearer or the Iu bearer. Corresponding computer programs and computer program products are also disclosed.

22 Claims, 5 Drawing Sheets

(51) Int. Cl.
  *H04W 76/10* (2018.01)
  *H04L 12/24* (2006.01)
  *H04L 12/26* (2006.01)
  *H04L 29/08* (2006.01)
  *H04W 4/70* (2018.01)
  *H04W 72/00* (2009.01)
  *H04W 88/02* (2009.01)
  *H04W 88/08* (2009.01)

(52) U.S. Cl.
  CPC ........ *H04L 43/0811* (2013.01); *H04L 67/322* (2013.01); *H04W 76/10* (2018.02); *H04W 76/12* (2018.02); *H04W 4/70* (2018.02); *H04W 72/00* (2013.01); *H04W 72/0413* (2013.01); *H04W 88/02* (2013.01); *H04W 88/08* (2013.01)

(56) References Cited

U.S. PATENT DOCUMENTS

| | | | |
|---|---|---|---|
| 2009/0144740 A1 | 6/2009 | Gao | |
| 2010/0157887 A1* | 6/2010 | Kopplin | H04L 47/10 370/328 |
| 2012/0307764 A1 | 12/2012 | Zhao et al. | |
| 2013/0023265 A1* | 1/2013 | Swaminathan | H04W 76/18 455/423 |
| 2014/0169192 A1* | 6/2014 | Zhang | H04W 24/08 370/252 |
| 2014/0219230 A1* | 8/2014 | Schierl | H04W 72/08 370/329 |
| 2016/0112896 A1* | 4/2016 | Karampatsis | H04W 28/0252 370/230.1 |
| 2018/0062819 A1* | 3/2018 | Horn | H04L 5/0058 |

FOREIGN PATENT DOCUMENTS

| | | |
|---|---|---|
| JP | 2002514034 A | 5/2002 |
| JP | 2013545392 A | 12/2013 |
| JP | 2014526163 A | 10/2014 |
| RU | 2478263 C2 | 3/2013 |
| RU | 2480934 C2 | 4/2013 |
| WO | 2009017446 A2 | 2/2009 |
| WO | 2009114643 A2 | 9/2009 |
| WO | 2012093640 A1 | 7/2012 |
| WO | 2013053376 A1 | 4/2013 |
| WO | 2013057315 A3 | 6/2013 |

OTHER PUBLICATIONS

3GPP, "3rd Generation Partnership Project; Technical Specification Group Services and System Aspects; Policy and charging control architecture (Release 12)", 3GPP TS 23.203 V12.0.0 (Mar. 2013), Mar. 2013, 1-183.

3GPP, "3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.3.0, Dec. 2013, 1-353.

3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.0.0, Dec. 2013, 1-278.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.3.0, Dec. 2013, 1-302.

Berchmans, Fredrick J. et al., "Optimizing Link Assignment to Enhance Service in Probabilistic Network", 2010 7th Annual IEEE Communications Society Conference on Sensor Mesh and Ad Hoc Communications and Networks (SECON), Jul. 2010, 1-9.

Myakotnykh, Eugene S. et al., "Analysis of Evolution Scenarios for End-to-end Quality of Services Provisioning in the Internet", IEEE Proceedings of the International Conference on Ultra Modern Telecommunications (ICUMT), St. Petersburg, Russia, Oct. 12-14, 2009, 1-5.

Sastry, Srikanth et al., "Reliable Networks with Unreliable Sensors", Pervasive and Mobile Computing, Mar. 3, 2012, 311-323.

Unknown, Author, "High Availability Category and Use Case", 3GPP TSG-SA1 #43, S1-084322, Telefónica S.A., Florida, Miami, USA, Nov. 17-21, 2008, 2 pages.

Unknown, Author, "3rd Generation Partnership Project; Technical Specification Group Services and System Aspects; Service requirements for machine-type communications; Stage 1 (Release 10)", 3GPP TS 22368 V1.0.0, Aug. 2009, 22 pages.

Unknown, Author, "LTE; Evolved Universal Terrestrial Radio Access (E-UTRA); S1 Application Protocol (S1AP)", 3GPP TS 36.413 version 9.0.0 Release 9, Oct. 2009, 228 pages.

* cited by examiner

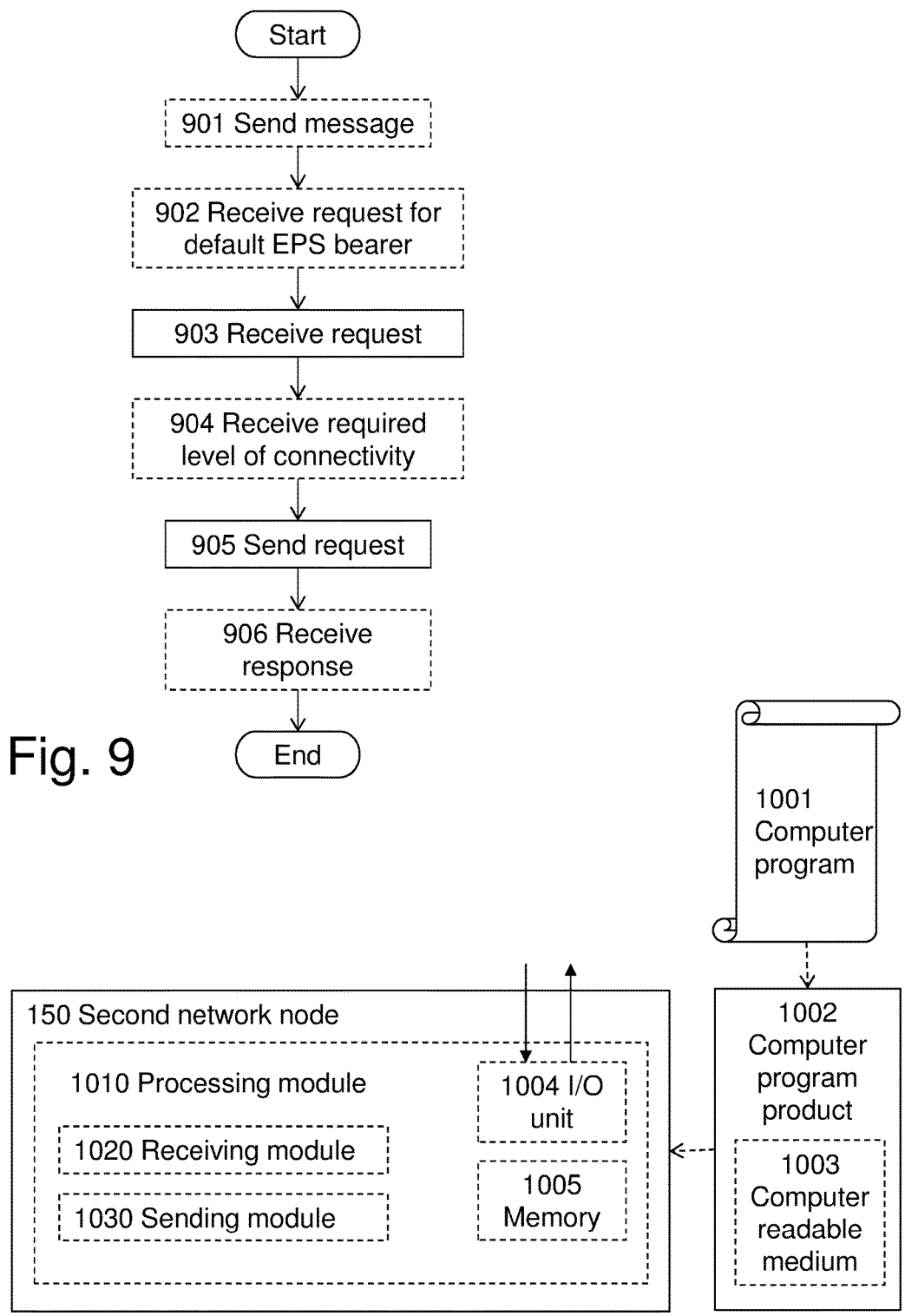

METHODS, WIRELESS DEVICE, RADIO BASE STATION AND SECOND NETWORK NODE FOR MANAGING EPS BEARER

TECHNICAL FIELD

Embodiments herein relate to wireless communication systems, such as telecommunication systems. A method and a wireless device for managing an EPS bearer, a method and a radio base station for setting parameters of an S1 bearer or Iu bearer as well as a method and a second network node for managing an EPS bearer are disclosed. Corresponding computer programs and computer program products are also disclosed.

BACKGROUND

Today wireless communication systems are mainly used for human-centered communication and services. A trend is, however, to use wireless communication systems for communication and services mainly involving machines. This kind of communication and services are often referred to as Machine-to-Machine (M2M) communication.

Certain types of communication and services within M2M communication are expected to require that a wireless connection, provided by the wireless communication systems, is highly reliable. The wireless connection is required to be highly reliable both in terms of loss of the wireless connection and the possibility of establishing the wireless connection. In the following, the term "reliable" is used in this context. Therefore, for the above mentioned certain types of communication and services within M2M communication, a high reliability of the connection, or the possibility to establish connection, may be said to be required.

This kind of high reliability may also be required for Person-to-Machine (P2M), Person-to-Person (P2P) and Machine-to-Person (M2P) communication.

Services that may need this kind of high reliability include industrial process control services, services for alarm monitoring, services in smart grid applications, control and management of business and/or mission critical processes or services, services for monitoring critical infrastructure and services towards responders in the national security and public safety segment and other similar services.

Furthermore, high reliability for certain services may be beneficial where deployment of nodes, such as radio base station, radio network controller etc., is particularly costly. At the same time, it is desired to achieve sufficient capacity, e.g. in terms of number of connected devices, and/or coverage for the services.

Consider for example a device, such as smart meters for a smart grid, a metering, sensing or activation device, that is deployed in a network at a remote location at high cost. If there would be a failure in communication with such a device e.g. due to bad coverage and/or insufficient capacity, a manual restoration of the communication with the device or a replacement of the device with another device would be required to compensate for the failure. Such compensation may imply high labor costs, which would scale in an unacceptable manner when there are a great number of devices which often is the case in application of M2M communication.

It is known to provide connectivity for M2M devices in a number of different ways using e.g. wired or wireless connections. The wired connections may be copper wires, optical fibers, Ethernet cables or the like. The wireless connections may be provided by use of various Radio Access Technologies (RATs), such as Wi-Fi, Evolved Universal Terrestrial Radio Access Network for Long Term Evolution (EUTRAN/LTE), Universal Terrestrial Radio Access Network for High Speed Packet Access (UTRAN/HSPA), Global System for Mobile communication (GSM) for Enhanced Data GSM Environment (EDGE) Radio Access Network (GERAN) and the like. Moreover, evolutions of the aforementioned RATs as well as other Third Generation Partnership Project (3GPP) networks may be used to provide the wireless connection.

During planning of the radio access networks and/or telecommunication systems mentioned above, it is sometimes desired to set up the radio access network such as to provide a high reliability for M2M devices. High connectivity could then be provided in the following ways.

For example, the radio access network could be deployed as over-dimensioned in terms of transport and/or radio link resources. Over-dimensioning of transport resources may refer to use of optical fibers for communication from a base station, while a peak bit-rate from the base station is 800 Megabits per second and an optical fiber may handle tens of Gigabits per second. Over-dimensioning of radio link resources refers to deployment of more base stations, antennas, use of more frequency bands, etc. than needed according to an estimated network load. The RAN is said to be over-dimensioned when it is deployed to be able to handle a worst case scenario while still having resources that are available for any upcoming communication.

As another example, so called node availability may be increased by introducing redundancy in a node by installing multiple power units for powering of the node. The node availability may relate to availability of e.g. transport nodes, radio nodes and server nodes, which communicate with the M2M device or control or support the network operation. Node availability decreases on failure of a node, which typically happens when power units for powering of the node breaks down.

As a further example, in some specific network segments, multiple paths could be introduced to avoid single point of failure. An optical fiber ring is able to cope with interruptions of one optical link by routing information in the opposite direction as compared to where the interrupted optical link is located.

During operation of a telecommunication system, it is desired to be able to provide certain quality of service while using the above mentioned radio access network and/or telecommunication system as planned above.

In order to provide certain quality of service, some known radio communication system provides a Quality of Service (QoS) framework. With the QoS framework, a QoS agreement can be set up between a service and the telecommunication system. The QoS agreement for the service typically specifies higher/lower pre-emption priorities, guaranteed vs. best effort data rates, high vs. low transmission delays, high vs. low bit error probability. The bit error probability, or packet error probability, for a specific connection relates to what potential data corruption may occur during a transmission.

In 3GPP EUTRAN/LTE, there is also a concept of Guaranteed Bit-Rate (GBR) and Non-Guaranteed Bit-Rate (NGBR) bearers. The principles for GBR bearers are that e.g. a mobile device requests a GBR bearer from the Radio Access Network (RAN). The GBR is to be used by a service executed in the mobile device. Once the GBR bearer has been established, the RAN will try to maintain the GBR bearer during the ongoing service until the GBR bearer is removed by the service. GBR bearers are typically used for Voice calls for which it is desired to minimize dropping of ongoing calls at the expense of other services or higher probability of blocking a call at setup thereof. A reason for this is that a user of the mobile device is likely more annoyed by a dropped ongoing call than a blocked call at setup.

For the above mentioned business and/or mission critical services, it is likely that an ongoing connection is not required at all, but still a high reliability for connection is required. If a GBR bearer is used for a mission critical service of this kind, resources of the telecommunication system would be consumed at all times, even though no connection is in fact required by the service. A disadvantage with using GBR bearers is hence that is it inefficient in these scenarios.

SUMMARY

An object may be to improve functionality relating to quality of service, such as the QoS agreement mentioned above, to fit needs of a so called critical service, which e.g. require high connectivity availability.

According to a first aspect, the object is achieved by a method, performed by a wireless device, for managing an Evolved Packet System, EPS, bearer towards a first network node. The wireless device sends, to a second network node, a request for setting up the EPS bearer for a service of the wireless device. The request is associated with a required level of a connectivity for the service. The required level relates to likelihood of maintaining the connectivity towards the first network node.

According to a second aspect, the object is achieved by a wireless device configured to manage an Evolved Packet System, EPS, bearer towards a first network node. The wireless device is configured to send, to a second network node, a request for setting up the EPS bearer for a service of the wireless device. The request is associated with a required level of a connectivity for the service. The required level relates to likelihood of maintaining the connectivity towards the first network node.

According to a third aspect, the object is achieved by a computer program for managing an Evolved Packet System, EPS, bearer. The computer program comprises computer readable code units which when executed on a wireless device causes the wireless device to perform the method above.

According to a fourth aspect, the object is achieved by a computer program product, comprising a computer readable medium and a computer program as described directly above stored on the computer readable medium.

According to a fifth aspect, the object is achieved by a method, performed by a radio base station, for setting parameters of an S1 bearer or an Iu bearer between the radio base station and a gateway node. The radio base station receives, from a second network node, a request for setting parameters of the S1 bearer or the Iu bearer. The request is associated with a required level of a connectivity for a service of a wireless device. The wireless device is served by the gateway node. The required level relates to likelihood of maintaining the connectivity, via the gateway node, towards a first network node.

According to a sixth aspect, the object is achieved by a radio base station, performed by a radio base station, for setting parameters of an S1 bearer or an Iu bearer between the radio base station and a gateway node. The radio base station is configured to receive, from a second network node, a request for setting parameters of the S1 bearer or the Iu bearer. The request is associated with a required level of a connectivity for a service of a wireless device. The wireless device is served by the gateway node. The required level relates to likelihood of maintaining the connectivity, via the gateway node, towards a first network node.

According to a seventh aspect, the object is achieved by a computer program for setting parameters of an S1 bearer or an Iu bearer. The computer program comprises computer readable code units which when executed on a radio base station causes the radio base station to perform method above.

According to an eighth aspect, the object is achieved by a computer program product, comprising a computer readable medium and a computer program as described directly above stored on the computer readable medium.

According to a ninth aspect, the object is achieved by a method, performed by a second network node, for managing an Evolved Packet System, EPS, bearer between a service of a wireless device and a first network node. The second network node receives, from the wireless device, a request for setting up the EPS bearer for the service. The second network node receives a required level of a connectivity for the service. The required level relates to likelihood of maintaining the connectivity towards the first network node. The second network node sends, to a radio base station, a request for setting parameters of an S1 bearer or an Iu bearer. The request is associated with the required level of the connectivity.

According to a tenth aspect, the object is achieved by a second network node configured to manage an Evolved Packet System, EPS, bearer between a service of a wireless device and a first network node. The second network node is configured to receive, from the wireless device, a request for setting up the EPS bearer for the service, to receive a required level of a connectivity for the service. The required level relates to likelihood of maintaining the connectivity towards the first network node, and to send, to a radio base station, a request for setting parameters of an S1 bearer or an Iu bearer. The request is associated with the required level of the connectivity.

According to an eleventh aspect, the object is achieved by a computer program for managing an Evolved Packet System bearer. The computer program comprises computer readable code units which when executed on a second network node causes the second network node to perform the method above.

According to a twelfth aspect, the object is achieved by a computer program product, comprising a computer readable medium and a computer program as described directly above stored on the computer readable medium.

The required level of the connectivity for the service is associated with, such as specified by, the request. In this manner, information about the required level of the connectivity is conveyed between the wireless device, the radio base station and the second network node. Therefore, in conjunction with or as part of the request, the required level of connectivity may be included in a QoS agreement of the kind mentioned above. As a consequence, the service is given connectivity via an EPS bearer, which the service may rely on. Furthermore, the radio base station and the second network node may use the required level of the connectivity for handling the service, such as a critical service as mentioned above. Hence, the above mentioned object is achieved.

An advantage with some embodiments herein is that existing QoS framework is extended to provide the required level of the connectivity.

BRIEF DESCRIPTION OF THE DRAWINGS

The various aspects of embodiments disclosed herein, including particular features and advantages thereof, will be readily understood from the following detailed description and the accompanying drawings, in which:

FIG. 9 is a flowchart illustrating embodiments of the method in the second network node, and FIG. 10 is a block diagram illustrating embodiments of the second network node.

DETAILED DESCRIPTION

Figure 1:
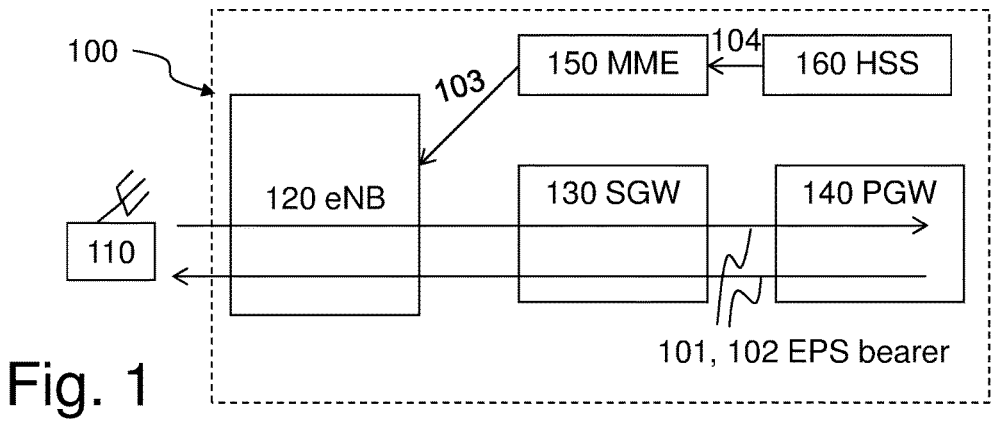
FIG. 1 is a schematic overview of an exemplifying wireless network in which embodiments herein may be implemented.

Throughout the following description similar reference numerals have been used to denote similar elements, units, modules, circuits, nodes, parts, items or features, when applicable. In the Figures, features that appear in some embodiments are indicated by dashed lines unless otherwise noted.

FIG. 1 depicts an exemplifying wireless network 100 in which embodiments herein may be implemented. In this example, the wireless network 100 is a Long Term Evolution (LTE) system. In other examples, the wireless network may be any cellular or wireless communication system, such as a Wideband Code Division Multiple Access (WCDMA) network, a Global System for Mobile communication (GSM network), Wireless Fidelity (Wi-Fi) or the like.

A wireless device 110 is shown in FIG. 1. The wireless network 100 may serve the wireless device 110.

The wireless network 100 comprises a radio base station 120, which may serve the wireless device 110. The radio base station 120 may be an evolved Node B (eNB), a Node B, a control node controlling one or more Remote Radio Units (RRUs), a radio base station, an access point, a Radio Network Controller (RNC) of UTRAN/WCDMA or the like The wireless network 100 further comprises a gateway node 130, such as Serving Gateway (SGW), Serving General Packet Radio System (GPRS) Support Node (SGSN) or the like. The wireless device 110 is served by the gateway node 130. This means that the gateway node 130 forwards data packets to/from the wireless device 110 from/to a first network node 140, which described directly below.

Moreover, the wireless network 100 comprises the first network node 140, such as a Packet Data Network Gateway (PGW), a Gateway General Packet Radio Services (GPRS) Support Node (GGSN) in UTRAN or the like. The wireless device 110 may be connected to the PGW by means of one or more EPS bearers 101, 102.

The wireless network 100 further comprises a second network node 150, such as a Mobility Management Entity (MME), a Serving GPRS Support Node (SGSN) in UTRAN or the like. The second network node 150 may control 103 the radio base station 120.

Furthermore, the wireless network 100 comprises a third network node 160, such as a Home Subscriber System (HSS), Home Location Register (HLR), Authentication, Authorization and Accounting (AAA) server or the like. The third network node 160 may send 104 information, such as information about subscribers and the like, to the second network node 150.

As used herein, the term "wireless device" may refer to a user equipment, a M2M device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user" may indirectly refer to the wireless device.

Before the embodiments herein are described, level of connectivity, as a concept, is explained with reference to the block diagrams in FIG. 2 and FIG. 3. The wireless device 110 may be referred to as a M2M device in the following.

Level of connectivity may also be referred to as connectivity availability. Generally, the level of connectivity is herein defined as a probabilistically guaranteed promise that some sufficiently good connectivity, which e.g. fulfils service requirements for a specific M2M service, can be provided at or above some degree of likelihood. Service requirements are further described in section "service requirements" below. In some examples, the level of connectivity may be a value relating to likelihood of maintaining the connectivity towards the wireless network 100, such as the first network node 140, for a service, such as the specific M2M service or the like.

Figure 2:
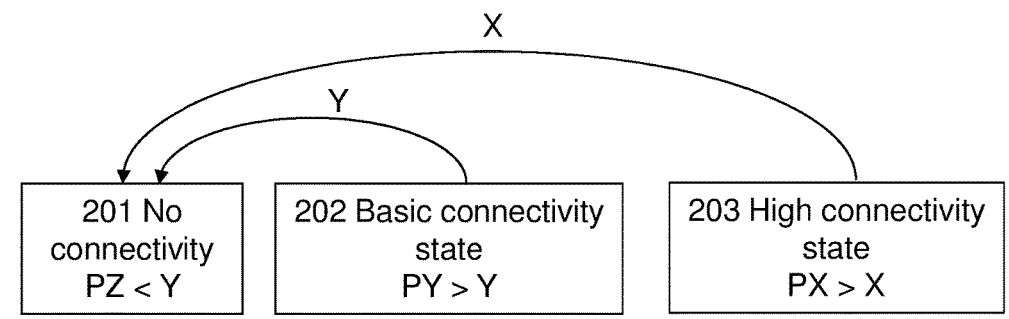
FIG. 2 is a block diagram illustrating states relating to level of connectivity.

FIG. 2 shows a block diagram illustrating three exemplifying states relating to levels of connectivity. The three exemplifying states includes a first state 201 with no connectivity, a second state 202 with basic level of connectivity and a third state 203 with high level of connectivity.

In this example, a level of connectivity is given by a probability value between 0 and 1. Therefore, the level of connectivity may be a digit, a value, a string of bits or the like, which is representing some specific level of connectivity. Thus, the level of connectivity relates to likelihood, or probability, for a service, executed in the wireless device 110, to maintain connectivity to the wireless network 100 and/or e.g. the first network node 140.

To maintain the connectivity means that the wireless device 110 may maintain, i.e. not drop, a wireless connection that has been established.

Moreover, to maintain the connectivity means that the wireless device 110 may establish, or set up, a wireless connection successfully with likelihood given by the probability value. Since the connectivity applies to the service, expressed herein as connectivity for the service, service requirements for the service are accordingly fulfilled by the connectivity, e.g. the wireless connection, be it an already exiting connection or a connection to be set up.

With the concept of level of connectivity, a required level of the connectivity shall be distinguished from an estimated level of the connectivity.

The required level of the connectivity may be determined by the service, i.e. the service, or in fact a person providing or handling the service, may set the required level of the connectivity to a certain values, e.g. 0.9. For this reason, the required level of the connectivity may be referred to as a desired, or even required, level of the connectivity. As mentioned above, level of connectivity in general may be represented by values between 0 and 1. Thus, a value of 0.9 may be considered to represent a high level of connectivity. The required level of the connectivity may also be a default level of the connectivity. The default level of the connectivity may apply for a particular service or a group of services. In other examples, the required level of the connectivity may be represented by descriptors as "poor", "medium", "high" or the like, which descriptors in turn may be associated with certain ranges of the level of the connectivity.

The required level of the connectivity may, additionally or alternatively, be set by a network node, comprised in the wireless network 100. The network node may handle requests for services and/or connections therefore. As an example, the network node may be an eNB in LTE, a Radio Network Controller (RNC), Mobility Management Entity (MME), Serving General Packet Radio Service Support Node (SGSN), Policy and Charging Rules Function (PCRF), Home Subscriber Server (HSS), Home Location Register (HLR) or the like. When the network node sets the required level of the connectivity, it may set different levels of the connectivity for different services, different users, i.e. different nodes such as the wireless device 110, different user groups, different types of devices and the like. The different users, or user groups, may be different in terms of subscriptions, home network etc. The different types of devices may be different in terms of being mobile or stationary, a user device or a machine device and the like.

The estimated level of the connectivity may for example be determined as described in section "Determining level of connectivity". The estimated level of the connectivity depends on radio conditions, traffic load etc. in the wireless network 100. Therefore, the estimated level of the connectivity reflects actual, or real, level of the connectivity for the service towards the wireless network. The estimated level may thus correspond to an actual, or current, level of the connectivity. As a consequence, when the estimated level is increased, or decreased, it means that the actual level of the connectivity, which the estimated level is an estimate of, is in fact increased, or decreased. The increase or decrease of the estimated level may occur due to that certain actions, e.g. relating to ensuring of the required level of the connectivity, as described herein are performed.

As described above, the level of the connectivity may be expressed as probability for a service to maintain connectivity to the wireless network 100. This means that the probability may be linked to a time period. Hence, as an example, the probability of losing the connectivity during an upcoming (future) time period is 0.9. In other examples, the probability may relate to that an event occurs. The event may e.g. be that a fire alarm report is in fact received by a probability of 0.9999 which would set a requirement that there is connectivity when the fire alarm actually goes off.

Furthermore, the level of the connectivity may be expressed as Mean Time Between Failures (MTBF). For example, when the MTBF of the connectivity is 100 years, failure is very rare.

The three exemplifying states relating to levels of the connectivity may be seen as a quantization of the levels of the connectivity.

In FIG. 2, threshold values X and Y for deciding when to consider the service to be in any one of the three states 201, 202, 203 relating to levels of the connectivity are indicated. Expressed differently, an exemplifying M2M device (not shown) may be in one of the three states depending on relations between an estimated probability value relating to the level of the connectivity and the threshold values X and Y. The M2M device may be an example of the wireless device 110.

The estimated probability value may be given, e.g. indirectly or directly, by the estimated level of the connectivity. Hence, the estimated probability value may be given indirectly by the estimated level of the connectivity when the estimated level of the connectivity represents a probability. For example, when the estimated level of the connectivity is equal to 300, it represents e.g. a probability of 0.7. This means that the estimated level of the connectivity may need to be translated, interpreted or the like, before it can be used as a probability value. Alternatively, the estimated probability value may be given directly by the estimated level of the connectivity when the estimated level of the connectivity is e.g. equal to 0.7. In this case, the estimated level of the connectivity can be used directly without a need for translation, interpretation or the like, since probability values range from zero to one.

The three states are in this example defined as follow, starting with the third state 203 for ease of explanation. In order to find out in which state the service is the estimated probability value may be determined as mentioned above. Throughout this example, it is assumed that the same service requirements for the service apply in all states.

High Connectivity State

The M2M device may be in a so called high connectivity state aka the third state. The connectivity may be considered high if the estimated probability value, here denoted PX, is e.g. above a threshold X. While using the reference numerals in the Figure, we have that PX>X.

Basic Connectivity State

The M2M device may be in a so called basic connectivity state aka the second state. While assuming in this example that the estimated probability value is PY, the connectivity may be considered to be basic if PY is e.g. above a threshold Y. At the same time, PY is not high enough to reach the high connectivity state, i.e. the estimated probability value PY is less than the threshold X. While using the reference numerals in the Figure, we have that Y<PY<X.

No Connectivity

The M2M device may be in a state of no connectivity aka the first state. In this state, the M2M device has no connection to the network or a connection that does not fulfil the service requirements, and the M2M device has therefore no service. Furthermore, the M2M device may not have, as far as it can be estimated, any possibility to obtain a connection. This means that the estimated probability value, now denoted by PZ, is not high enough to reach the basic connectivity state. As an example, the M2M device may be out-of-coverage in view of the wireless network 100. While using the reference numerals in the Figure, we have that PZ<Y.

In the description above, the M2M device is said to be in the different states mentioned above for reasons of simplicity. In some examples, in case a M2M device runs multiple services, each of those multiple services may be said to be in the different states. Some or all of the multiple services may be in the same state or all of the multiple services may be in a respective state.

In the following description, two example scenarios will be referred to in order to improve understanding.

In a first exemplifying scenario, the wireless network 100 is included in, or forms a part of, a traffic control system, which includes various entities, e.g. traffic lights, vehicle such as car and trucks, bicyclists carrying cellular phones. At least some of the entities communicate over the wireless network 100. This means that some entities of the traffic control system may be within the wireless network 100 and some other entities may be outside the wireless network 100.

As an example, some functions related to control of vehicles etc. can be automated when the high connectivity state is reached or available, but these functions need to operate in a half-automatic or manual mode for safety reasons when only basic connectivity state is reached or available.

In a second exemplifying scenario, the wireless network 100 is included in an industrial control system or power system. The industrial control system may comprise various entities, such as valves, transportation belts, spray devices for painting or physical/chemical treatment etc. At least some of the entities communicate over the wireless network 100. This means that some entities of the industrial control system may be within the wireless network 100 and some other entities may be outside the wireless network 100.

The industrial control system may operate at lower margins with higher efficiency, e.g. higher yield, when the entities communicating over the wireless network 100 have high connectivity state, e.g. with bounded latency, compared to when the entities only have basic connectivity state, which would require higher margins since the industrial control system needs e.g. more time to react, treat, open/close valves etc.

In the second scenario, it may be that the industrial control system is operated based on local information, or half-automatic mode, when the entities communication over the wireless network 100 have low connectivity state. Local information may have been stored in the entities prior to the low connectivity state.

Figure 3:
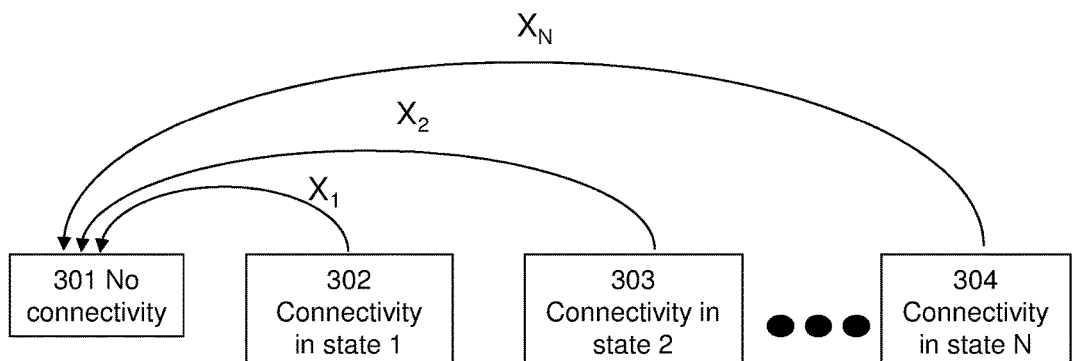
FIG. 3 is another block diagram illustrating states relating to level of connectivity.

In FIG. 3, another block diagram illustrates a more general case with N number of states relating to level of connectivity. As illustrated in this Figure, the states shown in FIG. 2 may be extended to include additional states with different levels of connectivity, e.g. with different transition probabilities X1 . . . XN for transition from one state to another.

Figure 4:
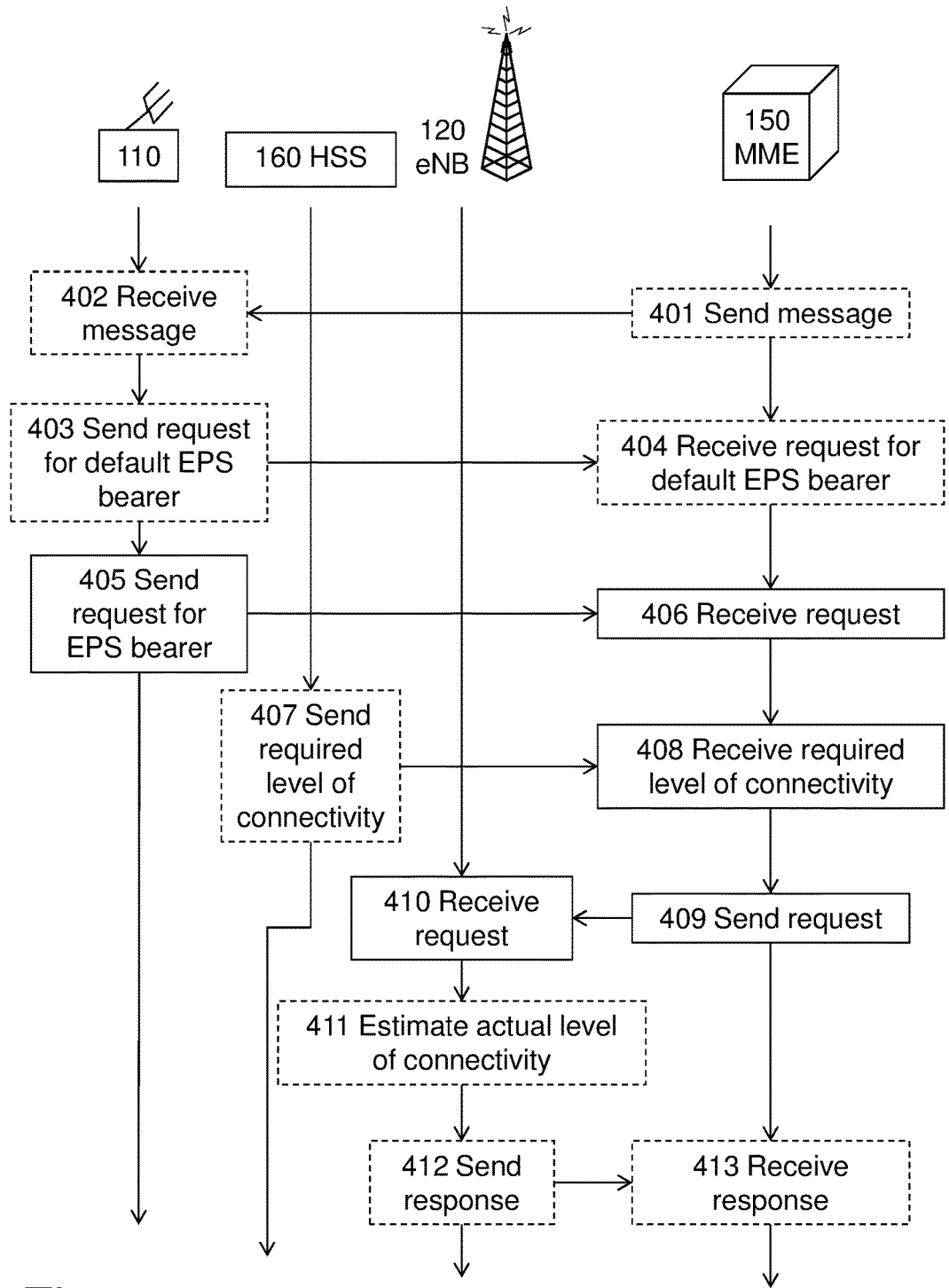
FIG. 4 is a schematic, combined signaling scheme and flowchart illustrating embodiments of the methods.

FIG. 4 illustrates an exemplifying method according to embodiments herein when implemented in conjunction with the wireless network 100 of FIG. 1. Thus, the wireless device performs a method for managing an EPS bearer towards the first network node 140. Moreover, the radio base station 120 performs a method for setting parameters of an S1 bearer between the radio base station 120 and the gateway node 130. Furthermore, the second network node 150 performs a method for managing the EPS bearer between the service of the wireless device 110 and the first network node 140.

In other examples, the S1 bearer may be replaced by an Iu bearer of an UTRAN network, as an example of the wireless network 100.

The following actions may be performed in any suitable order.

Action 401

In case of network initiated EPS bearer set up, the second network node 150 may send a message to the wireless device 110. Further information about network initiated EPS bearer set up may be found in for example 3GPP TS 23.401, version 12.3.0, section 5.4.1.

The message may be an ACTIVATE DEFAULT EPS BEARER CONTEXT REQUEST or an ACTIVATE DEDICATED EPS BEARER CONTEXT REQUEST as specified in TS 24.301, version 12.3.0. This message may also include the required level of the connectivity for the service when initiated from the network.

Action 402

This action is performed when action 401 has been performed. The wireless device 110 may receive the message from the second network node 150. In response to the message, the wireless device 110 may send a request for setting up the EPS bearer as in actions 403 and/or 405.

Action 403

In some examples the required level of the connectivity applies to dedicated EPS bearers, possibly only to dedicated bearers. In these examples, it may be required that a default bearer is setup first.

Thus, the wireless device 110 may send a request for a default EPS bearer towards the first network node 140, before action 405 is performed. This request may be a PDN CONNECTIVITY REQUEST.

Action 404

The second network node 150 may receive, from the wireless device 110, a request for setting up the EPS bearer for the service. In this example, the request may be the default EPS bearer and the request may be the PDN CONNECTIVITY REQUEST.

Action 405

As mentioned, this action may be performed in response to reception of the message in action 402. Alternatively, this action may be performed as a result of that the wireless device 110 wishes to set up the EPS bearer for the service, so called device initiated bearer set up. Device initiated bearer set up may thus be an alternative to network initiated set up mentioned in action 401.

Thus, the wireless device 110 sends, to the second network node 150, a request for setting up the EPS bearer for the service of the wireless device 110. The request is associated with a required level of a connectivity for the service. The required level relates to likelihood of maintaining the connectivity towards the first network node 140.

When action 403 has been performed, the request may be a BEARER RESOURCE ALLOCATION REQUEST or a BEARER RESOURCE MODIFICATION REQUEST. Moreover, the EPS bearer may be a dedicated EPS bearer.

When action 403 has not been performed, the EPS bearer may be a default EPS bearer and the request may be a PDN CONNECTIVITY REQUEST.

The request for setting up the EPS bearer may include information relating service requirements, such as QoS, in the form of a so called Quality Class Indicator (QCI). According to some embodiments herein, the QCI may be dependent on the required level of the connectivity. That is to say a certain set of QCI may be different from each other only in that the required level of connectivity differs between the QCI of the certain set. In detail, e.g. priority, packet delay budget, packet error loss rate may be the same for the QCIs in the certain set, but a respective required level of the connectivity associated with each QCI may be different from each other.

The request may include an indicator indicating the required level of the connectivity. In this example, the indicator is separated from the QCI.

Hence, it may be said that service requirements for the service may be associated with the required level of the connectivity and a set of parameters relating to quality of the service. Here, the set of parameters relating to quality may be QCI, Allocation and Retention Policy (ARP) or the like.

To summarize, the request may be a BEARER RESOURCE ALLOCATION REQUEST, a BEARER RESOURCE MODIFICATION REQUEST or a PDN CONNECTIVITY REQUEST and the EPS bearer may be a default EPS bearer or a dedicated EPS bearer. In this context, it shall be noted that the request is different from similar known requests for the following reason. The current specification, e.g. 3GPP TS 24.301, V12.3.0, section 8.3, does not include information about the required level of the connectivity or any other equivalent term therefor. It is suggested herein that information about the required level of the connectivity is included in the specification mentioned above, while keeping the same terminology, i.e. BEARER RESOURCE ALLOCATION REQUEST, BEARER RESOURCE MODIFICATION REQUEST, PDN CONNECTIVITY REQUEST or the like.

Action 406

The second network node 150 receives, from the wireless device 110, the request for setting up the EPS bearer for the service. Similarly, as for action 405, the request may relate to set up of the default EPS bearer or the dedicated EPS bearer.

Action 407

In some examples, the third network node 160 may send the required level of the connectivity to the second network node 150. In this manner, the second network node 150 may be made aware of the required level of the connectivity. This may happen when the required level of the connectivity applies to certain subscribers, users or groups thereof. The second network node 150 may store the required level of the connectivity in so called subscription registers. The second network node 150 may then append the required level of the connectivity or a representation thereof when performing e.g action 409.

Action 408

The second network node 150 receives the required level of a connectivity for the service. The required level relates to likelihood of maintaining the connectivity towards the first network node 140.

In some examples, the reception 408 of the required level of connectivity means that the required level is received in conjunction with the reception of the request in action 405.

In some other examples, the reception 408 of the required level of connectivity means that the required level is received from the third network node 160 in action 407.

Action 409

In order to set up the EPS bearer, the second network node 150 sends, to the radio base station 120, the request for setting parameters of an S1 bearer. The S1 bearer may connect the radio base station 120 to the gateway node 130. For transporting between the radio base station 120 and the gateway node 130, the EPS bearer may use the S1 bearer, e.g. the S1 bearer is an underlying bearer with respect to the EPS bearer.

The request for setting parameters of the S1 bearer is associated with the required level of the connectivity for the service. This means that the request may include the required level of the connectivity. The request for setting parameters of the S1 bearer may be a request for a bearer service, a S1 context setup message, a S1 bearer modification message or the like. In even more detail the request may be an INITIAL CONTEXT SETUP REQUEST or an E-RAB SETUP REQUEST as in TS 36.413. As indicated by E-RAB, the radio base station 120 may also in response to receiving the request establish a radio bearer towards the wireless device 110 and/or the service.

As mentioned about the request for setting up the EPS bearer, also the request for setting parameters of the S1 bearer is different from e.g. INITIAL CONTEXT SETUP REQUEST as specified in existing versions of the specifications mentioned above.

Action 410

This action is performed after action 409 has been performed. Thus, the radio base station 120 receives, from the second network node 150, the request for setting parameters of the S1 bearer. The wireless device 110 is served by the gateway node 130. The required level relates to likelihood of maintaining the connectivity, via the gateway node 130, towards a first network node 140.

Action 411

In order to be able to perform action 412, the radio base station 120 may estimate an estimated level of the connectivity, which may be compared to the required level of the connectivity. This means that the estimated level of the connectivity may be determined, or estimated, based on conditions relating to at least one connection for the wireless device (110). The conditions relating to said at least one connection may include at least one of:
  number of connections for the wireless device (110);
  quality of connections for the wireless device (110); and
    the like.

This is elaborated in section "Determining level of connectivity" below.

Action 412

Now that the radio base station 120 is aware of both the required and estimated level of the connectivity, the radio base station 120 may send, to the second network node 150, a response message indicating a relationship between the required level of the connectivity and the estimated level of the connectivity. The relationship may indicate that the required level is less than the estimated level. This means that the required level of the connectivity for the service is fulfilled. Sometimes, when it was not possible to fulfill the required level, the relationship may indicate that estimated level is less than required level.

The radio base station 120 may also adapt its operation based on the estimated level of the connectivity. This is elaborated in section "Adapting operation" below.

In some examples, not illustrated in the Figure, the radio base station 120 may forward information, extracted from the response message, about the relationship, or the response message itself, or a derivate thereof, to the wireless device 110. Then, the wireless device 110 may adapt its operation based on e.g. the estimated level of the connectivity. This is elaborated in section "adapting operation" below.

Action 413

After action 412 has been performed, the second network node 150 may receive, from the radio base station 120, the response message for indicating the relationship between the required level of the connectivity and the estimated level of the connectivity.

In some examples, not illustrated in the Figure, the second network node 150 may forward information, extracted from the response message, about the relationship, or the response message itself, or a derivate thereof, to the wireless device 110. Then, the wireless device 110 may adapt its operation based on e.g. the estimated level of the connectivity. This is elaborated in section "adapting operation" below.

Determining Level of Connectivity

As mentioned, the wireless network 100 may determine the level of the connectivity based on one or more conditions relating to at least one connection for the wireless device 110, the network node 120 and/or the service. In the following the term "M2M device" will be used to refer to e.g. the wireless device 110, the first network node 140 and/or the service.

The expression "a connection for the M2M device" refers to that a connection is usable by the M2M device.

The connection that is useable by the wireless device 110 shall be understood to mean a connection which the M2M device is capable of using or which the M2M device already uses. The connection that the M2M device is capable of using may be called a potential or possible connection. Thus, the potential connection for the M2M device is not yet established, i.e. the M2M device is not attached to the wireless network 100 by means of such potential connection.

An already used connection does not necessarily mean that the connection is actively used for transmission of data. Instead, it is enough that the already used connection is established between the wireless device 110 and e.g. the second network node 150. For LTE, this means that the wireless device 110 can be in either so called idle mode or connected mode, which modes are referred to as RRC_IDLE and RRC_CONNECTED in Technical Specification (TS) 36.331 of the 3GPP group.

In the following examples, criteria for when to consider the level of connectivity to be high are given.

As a first example, the conditions relating to the at least one connection for the M2M device include, as mentioned, the number of connections for the M2M device.

At least U number of possible connections, which sometimes may be called connectivity links or paths, may be provided to the M2M device at a sufficiently good link quality.

Possible connections may be:
connections of the same radio technology, e.g. same or different frequency carriers, but e.g. to different base stations,
connections of the same radio technology to the same base stations but at different frequencies,
connections provided via different radio technologies, e.g. to the same or different base stations,
connections that provide connectivity to different access networks/operators,
fixed/wired connections, such as copper wires and the like.

Base station may here refer to radio network nodes, access points, relay nodes, repeaters and the like.

For the case above, the different connections can either be established simultaneously to the device or in case only some of the connections are established it is predicted, based e.g. on measurements, that it would be possible to establish the alternative connections in case the first set of connections are deemed lost.

As a second example, the conditions relating to the at least one connection for the M2M device include, as mentioned, the quality of connections for the M2M device.

The connections of the M2M device may be provided at a desired QoS level with a significant so called link margin.

For example, when the required transmit power of the M2M device is consistently X dB below the permitted power as determined by the wireless network 100 e.g. depending on interference restrictions.

As other example, the required radio resources for a connection are consistently Y % less than what is allocated, or available, for a connection. In detail, this may be that only half, i.e. Y=50%, of the bit rate specified for the connection, i.e. a Guaranteed Bit Rate (GBR) bearer, is used.

As a third example, the conditions relating to the at least one connection for the M2M device include, as mentioned, the variance of quality of connections for the M2M device. When the variance of quality of connections is below Z for all or at least S number of connections, then the level of connectivity may be considered high, assuming the average quality of the connections is considered good as is explained in the example below.

An example of quality of connections is connection margin, or link margin. Now assume that the M2M device has a certain level of connectivity, e.g. there are two connections available with at least 10 dB margin beyond what is needed for the required quality of service. The certain level of connectivity may be considered as a fulfilling the high connectivity state requirement if the margin has been stable over a time period. E.g. the margin was at least 10 dB during 95% of the time during the last 180 days, and variance of the margin was below a threshold Z.

At the same time, another M2M device with the same certain level of connectivity may be considered as not fulfilling the high connectivity state requirement for this other M2M device. As reason for this may be that in order to consider the other M2M device to fulfill the high connectivity state requirement, it may be required that the margin is very stable, i.e. variance of the margin should be less than P, where P=0.7*Z as an example. This means that P<Z.

In these manners, the estimated level of the connectivity for the M2M device is taking time dynamics of the quality of connections into account.

As a fourth example, the conditions relating to the at least one connection for the M2M device include, as mentioned, the correlation between connections for the M2M device. When the correlation of connections is below U for all or at least T number of connections, then the level of connectivity may be considered high.

As an example, connections which have many common elements or properties are considered to have high correlation, while connections which have different elements or properties have low correlation. Examples of elements include nodes, transport links, antennas, hardware configuration and the like. Examples of properties include radio frequency band, radio access technology or the like.

As a further example, assume a first path has a set of nodes x1 and links y1 and networks z1 to pass through, and a second path has accordingly x2/y2/z2 nodes/links/networks. A failure correlation, e.g. given as a value between 0 for no correlation and 1 for full correlation is determined e.g. by the M2M device. This can e.g. be done by determining how many of the x1/y1/z1 are common with x2/y2/z2. In this correlation also characteristics of the different elements in x/y/z may be considered. E.g. if the first and second paths share a common backhaul link, this link is determined to affect the correlation largely; at the same time, if the first and second paths share a common optical fiber transport link between two cities, this transport link may be considered as not affecting the correlation strongly, if it is determined that this link has a low probability of failure or a technical fallback mechanism in-build. Essentially this means that different nodes and links are assigned different weights depending on the individual reliability of the node and link when determining the overall failure correlation.

As a fifth example, the conditions relating to the at least one connection for the M2M device include, as mentioned, the network conditions impacting connections for the M2M device. The network conditions may be network load, radio interference, radio obstructions etc. The network load may refer to traffic generated from other users in a local area of the M2M device, number of active users etc. The radio interference may relate to harmful radio transmission received from other users, which decreases signal quality received at the M2M device. The radio obstructions may be if a user is in or behind a house which leads to weaker radio signals.

In further examples, the conditions relating to the at least one connection for the M2M device may include information about the mobility, e.g. stationary, limited movement, fully mobile, and capabilities of the M2M device, e.g. supported radio access, supported frequency bands, processing capabilities, power classes, etc.

Service Requirements

In a wireless communication system like LTE, the service requirements may be defined by a set of parameters relating to Quality of Service (QoS). In 3GPP Technical Specification (TS) 23.203, a set of QoS Class Indicators (QCI) are described. The service that is set up is thus associated with a certain QCI, in e.g. a range from 1 to 9. Each QCI describes for example acceptable delay and error rate for the associated service.

Service requirements are also defined for GSM, UTRAN and the like.

Adapting Operation

Now that the M2M device has received or estimated the estimated level of connectivity, the M2M device is able to adapt its operation based on the estimated level of connectivity. As mentioned, the wireless device 110, the radio base station 120, or the second network node 150 may be referred to as the M2M device.

One way of adapting the operation for the M2M device, such as the wireless device 110, is to select a mode of operation for the service, referred to as service mode, based on the estimated level of the connectivity.

The M2M device selects one of the service modes based on the level of the connectivity. As an example, the M2M device may select a service mode that is proportional to the level of the connectivity when the service mode is represented by a number, or digit. Higher numbers may correspond to that higher levels of the connectivity are required for the service to be executed with high reliability, e.g. in a secure manner or fail safe manner. A high level of the connectivity typically means that there is a high probability, e.g. above a threshold value such as 0.9, that the connectivity will be maintained.

In some embodiments, the service modes may comprise at least two modes of operation. Thus, the service modes may comprise a first service mode and a second service mode.

In these embodiments, the M2M device may select the first service mode when the estimated level of the connectivity exceeds a first value of connectivity for allowing the service to be operated in the first service mode. The first value may be specified in a standard, pre-configured by end user/operator, and signaled dynamically e.g. when the M2M device registers to the wireless network 100. Alternatively, the M2M device may select the second service mode when the estimated level of the connectivity exceeds a second value of connectivity for allowing the service to be operated in the second service mode.

As an example, a control system may comprise the M2M device and a controller node for controlling the M2M device. In this example, the service of the M2M device may be said to be allowed to be operated in the first or second service mode when the control system is stable. Stable, or stability, has its conventional meaning when used in connection automatic control engineering, i.e. the control system may not easily be set into a state where control signals oscillate or are outdated such that the control system ceases to work as intended.

Another way of adapting the operation for the M2M device is to adjust an amount of probe messages based on the required level of the connectivity and the estimated level of the connectivity. Thanks to sending of probe messages the M2M device may determine if it has connectivity, e.g. by receiving a response to the sent probe message. In case, the M2M device is a so called device server, it may send probe messages to determine if it has lost connectivity to a client device because the device server does no longer receive the probe messages sent by the client device, i.e. the probe messages are sent from the client device as keep alive signaling. In this context, a device server is serving the client device with respect to a service executed by the client device.

The probe messages are sent, by the M2M device, to the wireless network 100 for verification of the required level of the connectivity.

The amount of the probe messages may relate to one or more of:

a periodicity at which the probe messages are sent from the M2M device;

number of cells to which the probe messages are sent;

number of radio access technologies used when the probe messages are sent;

number of carriers used when the probe messages are sent, and the like.

The periodicity at which the probe messages are sent from the M2M device may be an indication of in which time slots, the M2M device may send the probe messages. The periodicity may sometime be given by a frequency value.

The number of cells, typically per each radio access technology used, to which the probe messages are sent may relate to a number of radio network nodes, such as the radio base station 120, to which the probe messages are sent or broadcast.

The number of radio access technologies used when the probe message are sent may be that one radio network node, such as the radio base station 120, is a multi-RAT radio network node. Then, it may be that the probe messages are sent on connections using some or all of these multi-RATs in order to adjust the amount of probe messages sent.

The number of carriers, or carrier frequencies, used when the probe messages are sent may be that one radio network node, such as the radio base station 120, is capable of transmitting and receiving at a plurality of frequencies. Then, it may be that the probe messages are sent on connections using some or all of the plurality of frequencies in order to adjust the amount of probe messages sent.

As already mentioned above, the amount of probe message may relate to a combination of one or more of the above mentioned meanings of the amount of probe messages. Hence, the adjusting of the amount of the probe messages may be an adaption of number of the probe messages sent over various connections, or links, according to the above.

A further way of adapting operation may be that the radio base station 120 adapts operation by configuring a first set of resources to increase an estimated level of the connectivity for the service. Hence, the radio base station 120 ensures, or attempts to ensure, that the required level of connectivity is fulfilled.

Hence, the radio base station 120 may configure the first set of resources according to one or more of the following manners. In the paragraphs below, the radio base station 120 will be referred to as "ensuring node".

In a first manner, the ensuring node may configure the first set of resources by reserving a sub-set of the first set of resources for the service, wherein at least the sub-set of resources are required to ensure the required level of the connectivity.

As an example, the first set of resources may be resources blocks, such as Physical Resource Blocks, of a time-frequency grid in LTE. Then, the ensuring node may reserve a sub-set of the resource blocks such that these resources blocks are available for the service when required.

As an example, the reserved sub-set of the first set of resources may be reserved by that if a request for service of the same or less Allocation and Retention Policy (ARP) priority is received at the ensuring node, the ensuring node may need to reject such request for service if the reserved sub-set of resources would be allocated when admitting the request.

In a second manner, the ensuring node may configure the first set of resources by reducing an amount of the first set of resources, which amount of the first set of resources are assigned to a further service in advance of or when the service becomes active.

As mentioned, the first set of resources may be resources blocks, such as Physical Resource Blocks, of a time-frequency grid in LTE. Then, the ensuring node may determine that a specific amount of resources blocks are used by the further service. Thereafter, the ensuring node may reduce the specific amount such that the service is prioritized at the expense of the further service, which may degrade, such as experience delays, or even interruption.

In a third manner, the ensuring node may configure the first set of resources by moving a further service, to which some of the first set of resources have been assigned, in advance of or when the service becomes active, to a second set of resources. The second set of resources is different from the first set of resources.

As an example, the ensuring node may perform a handover or a cell change order to move at least one further wireless device to another cell, another frequency band or another Radio Access Technology (RAT) than that of the wireless device 120. The cell change order may mean that the ensuring node sends a message for instructing the further wireless device to perform a change cell, or perform cell reselection.

In a fourth manner, the ensuring node may configure the first set of resources by increasing the first set of resources by allocating further Random Access (RA) channels to the service and/or transmit with increased transmit power.

As an example relating to the allocation of further RA channels, the ensuring node may configure different number of occasions in time, e.g. periodicity in terms of 5 ms, 10 ms or the like, and different number of occasions in frequency, e.g. in terms of 1, 2, 3 Resource Blocks (RB) or the like. It may here be noted that the number of Random Access occasions, i.e. in terms of time and/or frequency, are configured per cell in LTE. With many occasions, i.e. many RA resources/channels, it means that the total number of uplink RBs that can be used for data will be fewer, but the success rate of the Random Access Channel will be higher even at high network load. Thus, the level of the connectivity may be ensured e.g. in terms of being fulfilled, or the level of the connectivity may at least be increased.

As an example relating to transmit with higher power, the ensuring node may increase transmit power for the user whose level of connectivity is to be ensured. This may lead to that the ensuring node reduces transmit power assigned to other users, i.e. those users for which level of connectivity is not to be ensured.

In yet further examples, a more robust coding may be used for the users whose level of connectivity is to be ensured, or increased.

In a fifth manner, the ensuring node may configure the first set of resources by setting up a connection towards the wireless device 110 while using at least some of the first set of resources.

In an example, it is assumed that a user for which the level of the connectivity is to be ensured, or increased, has a first connection which uses a first radio access technology. Then the ensuring node may set up a further connection which uses a second radio access technology, which is different from the first radio access technology. This may be beneficial for the user if the user is considered to have high connectivity when there are at least two existing connections.

In a sixth manner, the ensuring node may configure the first set of resources by sending a message to the wireless device 110. The message instructs the wireless device 110 to measure on non-serving cells, non-serving frequencies, non-serving Radio Access Technologies to find a third set of resources for increasing the estimated level of the connectivity. The third set of resources is different from the first set of resources.

As mentioned above, the ensuring node may combine one or more of the first to sixth manners to obtain yet further manners of configuring the first set of resources.

Figure 5:
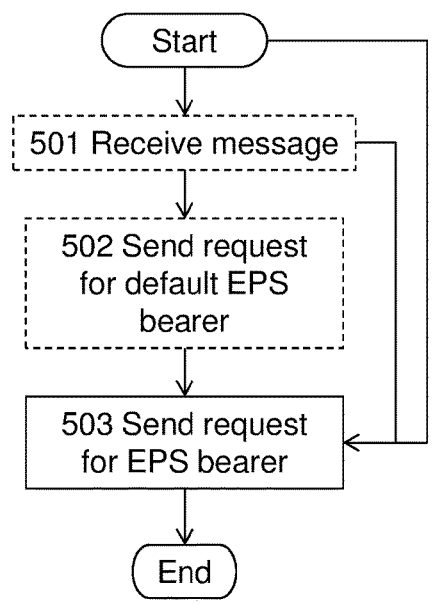
FIG. 5 is a flowchart illustrating embodiments of the method in the wireless device.

In FIG. 5, an exemplifying, schematic flowchart of the method in the wireless device 110 is shown. As mentioned, the wireless device 110 performs a method for managing an Evolved Packet System, EPS, bearer towards a first network node 140.

Service requirements for the service may comprise the required level of the connectivity and a set of parameters relating to quality of the service.

As mentioned, the S1 bearer may be replaced by an Iu bearer of an UTRAN network, as an example of the wireless network 100.

The following actions may be performed in any suitable order.

Action 501

The wireless device 110 may receive a message the second network node 150.

The message may be an ACTIVATE DEFAULT EPS BEARER CONTEXT REQUEST or an ACTIVATE DEDICATED EPS BEARER CONTEXT REQUEST as specified in TS 24.301, version 12.3.0. This message may also include the required level of the connectivity for the service when initiated from the network. Thus, in this manner, a connection, such as in the form of an EPS bearer, may be established between the wireless device 110 and the first network node 140 in case of so called network initiated EPS bearer set up. This action is similar to action 401.

Action 502

Before the sending of the request in action 503, the wireless device 110 may send, to the second network node 150, a request for setting up a default EPS bearer towards the first network node 140. This action is similar to action 403.

Action 503

The wireless device 110 sends, to a second network node 150, a request for setting up the EPS bearer for a service of the wireless device 110. The request is associated with a required level of a connectivity for the service. The required level relates to likelihood of maintaining the connectivity towards the first network node 140. This action is similar to action 403, 405.

As mentioned, the request may be a BEARER RESOURCE ALLOCATION REQUEST, a BEARER RESOURCE MODIFICATION REQUEST or a PDN CONNECTIVITY REQUEST.

When the request is a BEARER RESOURCE ALLOCATION REQUEST or a BEARER RESOURCE MODIFICATION REQUEST, the EPS bearer may be a dedicated EPS bearer.

When the request is a PDN CONNECTIVITY REQUEST, the EPS bearer may be a default EPS bearer.

Figure 6:
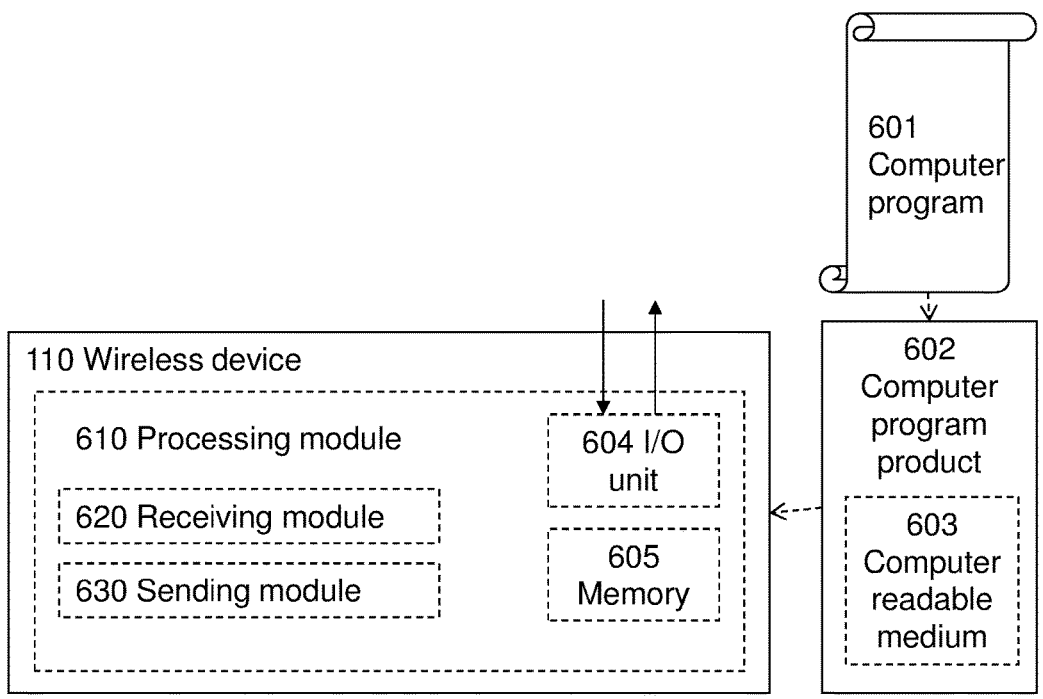
FIG. 6 is a block diagram illustrating embodiments of the wireless device.

With reference to FIG. 6, a schematic block diagram of the wireless device 110 is shown. The wireless device 110 is configured to perform the methods in FIGS. 4 and/or 5. Thus, the wireless device 110 is configured to manage an Evolved Packet System, EPS, bearer towards a first network node 140.

Service requirements for the service may comprise the required level of the connectivity and a set of parameters relating to quality of the service.

As mentioned, the S1 bearer may be replaced by an Iu bearer of an UTRAN network, as an example of the wireless network 100.

According to some embodiments herein, the wireless device 110 may comprise a processing module 610. In further embodiments, the processing module 610 may comprise one or more of a receiving module 620 and a sending module 630 as described below.

The wireless device 110, the processing module 610 and/or the receiving module 620 may be configured to receive the message as described above in action 501.

The wireless device 110, the processing module 610 and/or the sending module 630 is configured to send, to a second network node 150, a request for setting up the EPS bearer for a service of the wireless device 110. The request is associated with a required level of a connectivity for the service. The required level relates to likelihood of maintaining the connectivity towards the first network node 140.

As mentioned, the request may be a BEARER RESOURCE ALLOCATION REQUEST, a BEARER RESOURCE MODIFICATION REQUEST or a PDN CONNECTIVITY REQUEST.

When the request is a BEARER RESOURCE ALLOCATION REQUEST or a BEARER RESOURCE MODIFICATION REQUEST, the EPS bearer may be a dedicated EPS bearer.

The wireless device 110, the processing module 610 and/or the sending module 630 may be configured to send, to the second network node 150, a request for setting up a default EPS bearer towards the first network node 140, before the request may be sent.

When the request is a PDN CONNECTIVITY REQUEST, the EPS bearer may be a default EPS bearer.

The wireless device 110 may further comprise an Input/output (I/O) unit 604 configured to send and/or the required and/or estimated level of the connectivity, the message and other messages, values, indications and the like as described herein. The I/O unit 604 may comprise the receiving module 620, the sending module 630, a transmitter and/or a receiver.

Furthermore, the wireless device 110 may comprise a memory 605 for storing software to be executed by, for example, the processing module when the processing module is implemented as a hardware module comprising at least one processor or the like.

FIG. 6 also illustrates software in the form of a computer program 601 for managing an Evolved Packet System, EPS, bearer. The computer program 601 comprises computer readable code units which when executed on the wireless device 110 causes the wireless device 110 to perform the method according to FIGS. 4 and/or 5.

Finally, FIG. 6 illustrates a computer program product 602, comprising computer readable medium 603 and the computer program 601 as described directly above stored on the computer readable medium 603.

Figure 7:
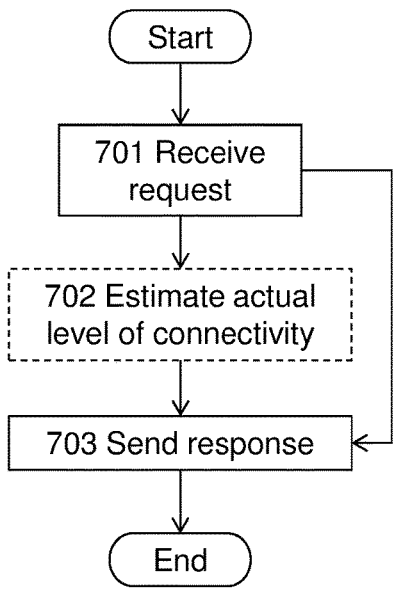
FIG. 7 is a flowchart illustrating embodiments of the method in the radio base station.

In FIG. 7, an exemplifying, schematic flowchart of the method in the radio base station 120 is shown. As mentioned, the radio base station 120 performs a method for setting parameters of an S1 bearer between the radio base station 120 and a gateway node 130.

As mentioned, service requirements for the service may comprise the required level of the connectivity and a set of parameters relating to quality of the service.

As mentioned, the S1 bearer may be replaced by an Iu bearer of an UTRAN network, as an example of the wireless network 100.

The following actions may be performed in any suitable order.

Action 701

The radio base station 120 receives, from a second network node 150, a request for setting parameters of the S1 bearer. The request is associated with a required level of a connectivity for a service of a wireless device 110. The wireless device 110 is served by the gateway node 130. The required level relates to likelihood of maintaining the connectivity, via the gateway node 130, towards a first network node 140.

As mentioned, the request for setting parameters of the S1 bearer may be a S1 context setup message or a S1 bearer modification message.

This action is similar to action 410.

Action 702

The radio base station 120 may estimate an estimated level of the connectivity. The estimated level of the connectivity relates to likelihood of maintaining the connectivity. The estimated level may be estimated based on one or more of:

number of connections for the wireless device 110; and
quality of connections for the wireless device 110.

This action is similar to action 411.

Action 703

The radio base station 120 may send, to the second network node 150, a response message indicating a relationship between the required level of the connectivity and the estimated level of the connectivity. This action is similar to action 412.

Figure 8:
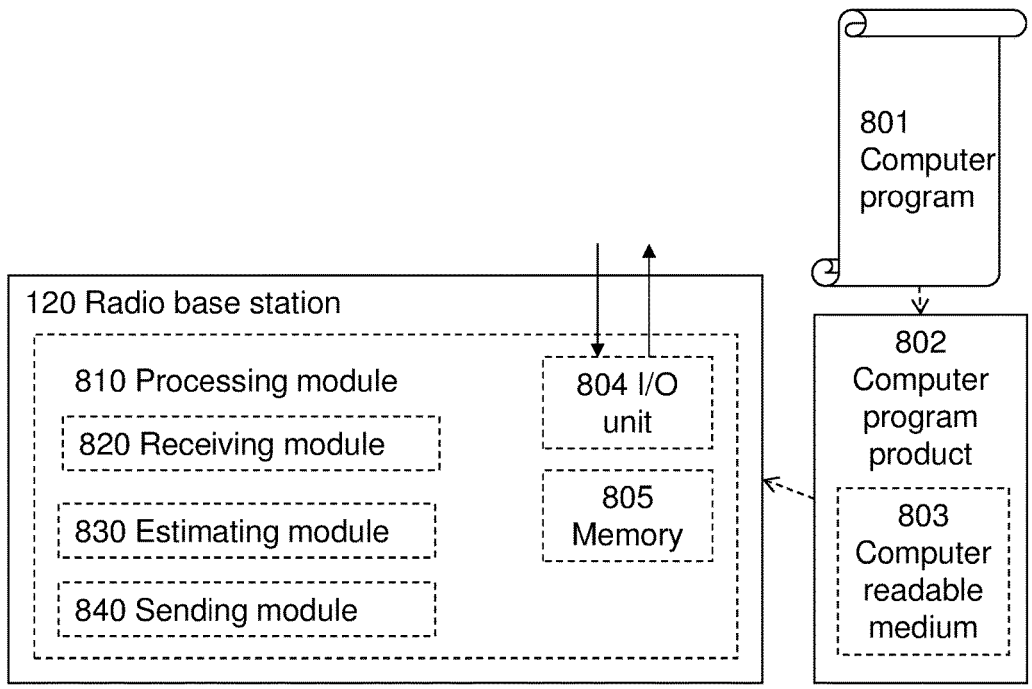
FIG. 8 is a block diagram illustrating embodiments of the radio base station.

With reference to FIG. 8, a schematic block diagram of the radio base station 120 is shown. The radio base station 120 is configured to perform the methods in FIGS. 4 and/or 7. Thus, the radio base station 120 is configured to set parameters of an S1 bearer between the radio base station 120 and a gateway node 130.

As mentioned, service requirements for the service may comprise the required level of the connectivity and a set of parameters relating to quality of the service. As mentioned, the S1 bearer may be replaced by an Iu bearer of an UTRAN network, as an example of the wireless network 100.

According to some embodiments herein, the radio base station 120 may comprise a processing module 810. In further embodiments, the processing module 810 may comprise one or more of a receiving module 820, an estimating module 830 and a sending module 840 as described below.

The radio base station 120, the processing module 810 and/or the receiving module 820 is configured to receive, from a second network node 150, a request for setting parameters of the S1 bearer. The request is associated with a required level of a connectivity for a service of a wireless device 110. The wireless device 110 is served by the gateway node 130. The required level relates to likelihood of maintaining the connectivity, via the gateway node 130, towards a first network node 140. The request may be a S1 context setup message or a S1 bearer modification message.

The radio base station 120, the processing module 810 and/or the estimating module 830 may be configured to estimate an estimated level of the connectivity. The estimated level of the connectivity relates to likelihood of maintaining the connectivity. The estimated level may be estimated based on one or more of: number of connections for the wireless device 110; quality of connections for the wireless device 110; and the like.

The radio base station 120, the processing module 810 and/or the sending module 840 may be configured to send, to the second network node 150, a response message indicating a relationship between the required level of the connectivity and the estimated level of the connectivity.

The radio base station 120 may further comprise an Input/output (I/O) unit 804 configured to send and/or the required and/or estimated level of the connectivity, the request for setting parameters, the response message and other messages, values, indications and the like as described herein. The I/O unit 804 may comprise the receiving module 820, the sending module 830, a transmitter and/or a receiver.

Furthermore, the radio base station 120 may comprise a memory 805 for storing software to be executed by, for example, the processing module when the processing module is implemented as a hardware module comprising at least one processor or the like.

FIG. 8 also illustrates software in the form of a computer program 801 for setting parameters of an S1 bearer. The computer program 801 comprises computer readable code units which when executed on the wireless device 110 causes the wireless device 110 to perform the method according to FIGS. 4 and/or 5.

Finally, FIG. 8 illustrates a computer program product 802, comprising computer readable medium 803 and the computer program 801 as described directly above stored on the computer readable medium 803.

In FIG. 9, an exemplifying, schematic flowchart of the method in the second network node 150 is shown. As mentioned, the second network node 150 performs a method for managing an Evolved Packet System, EPS, bearer between a service of a wireless device 110 and a first network node 140.

The following actions may be performed in any suitable order.
Action 901
In case of network initiated EPS bearer set up, the second network node 150 may send a message, as described above in action 501 and 401, to the wireless device 110. This action is similar to action 401.
Action 902
The second network node 150 may receive, from the wireless device 110, a request for setting up the EPS bearer for the service. In this example, the request may be the default EPS bearer and the request may be the PDN CONNECTIVITY REQUEST. This action is similar to action 404.
Action 903
The second network node 150 receives, from the wireless device 110, a request for setting up the EPS bearer for the service. This action is similar to action 404, 406.
Action 904
The second network node 150 receives a required level of a connectivity for the service. The required level relates to likelihood of maintaining the connectivity towards the first network node 140.

As, mentioned, the required level of the connectivity may be received from a third network node.

This action is similar to action 408.
Action 905
The second network node 150 sends, to a radio base station 120, a request for setting parameters of an S1 bearer. The request is associated with the required level of the connectivity. This action is similar to action 409.

As mentioned, the request may be associated with service requirements, including a set of parameters relating to quality of the service for the service of the wireless device 110, and the required level of the connectivity.

As mentioned, the S1 bearer may be replaced by an Iu bearer of an UTRAN network, as an example of the wireless network 100.
Action 906
The second network node 150 may receive, from the radio base station 120, a response message for indicating a relationship between the required level of the connectivity and the estimated level of the connectivity.

This action is similar to action 413.

With reference to FIG. 10, a schematic block diagram of the second network node 150 is shown. The second network node 150 is configured to perform the methods in FIGS. 4 and/or 9. Thus, the second network node 150 is configured to manage an Evolved Packet System, EPS, bearer between a service of a wireless device 110 and a first network node 140.

According to some embodiments herein, the second network node 150 may comprise a processing module 1010. In further embodiments, the processing module 1010 may comprise one or more of a receiving module 1020 and a sending module 1030 as described below.

The second network node 150, the processing module 1010 and/or the receiving module 1020 is configured to receive, from the wireless device 110, a request for setting up the EPS bearer for the service. The request may be associated with service requirements, including a set of parameters relating to quality of the service for the service of the wireless device 110, and the required level of the connectivity.

The second network node 150, the processing module 1010 and/or the receiving module 1020 is configured to receive a required level of a connectivity for the service. The required level relates to likelihood of maintaining the connectivity towards the first network node 140. The required level of the connectivity may be received from a third network node.

The second network node 150, the processing module 1010 and/or the sending module 1030 is configured to send, to a radio base station 120, a request for setting parameters of an S1 bearer. The request is associated with the required level of the connectivity.

As mentioned, the S1 bearer may be replaced by an Iu bearer of an UTRAN network, as an example of the wireless network 100.

The second network node 150, the processing module 1010 and/or the receiving module 1020 may be configured to receive, from the radio base station 120, a response message for indicating a relationship between the required level of the connectivity and the estimated level of the connectivity.

The second network node 150 may further comprise an Input/output (I/O) unit 1004 configured to send and/or the required and/or estimated level of the connectivity, the request for setting parameters of the S1 bearer, the request for setting up the EPS bearer for the service and other messages, values, indications and the like as described herein. The I/O unit 1004 may comprise the receiving module 1020, the sending module 1030, a transmitter and/or a receiver.

Furthermore, the second network node 150 may comprise a memory 1005 for storing software to be executed by, for example, the processing module when the processing module is implemented as a hardware module comprising at least one processor or the like.

FIG. 10 also illustrates software in the form of a computer program 1001 for managing an Evolved Packet System bearer. The computer program 1001 comprises computer readable code units which when executed on the wireless device 110 causes the wireless device 110 to perform the method according to FIGS. 4 and/or 5.

Finally, FIG. 10 illustrates a computer program product 1002, comprising computer readable medium 1003 and the computer program 1001 as described directly above stored on the computer readable medium 1003.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the term "resource" may refer to a certain coding of a signal and/or a time frame and/or a frequency range in which the signal is transmitted. In some examples, a resource may refer to one or more physical resource blocks (PRB) which are used when transmitting the signal. In more detail, a PRB may be in the form of orthogonal frequency division multiplexing (OFDM) PHY resource blocks (PRB). The term "physical resource block" is known from 3GPP terminology relating to e.g. Long Term Evolution Systems.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless device, wherein the method comprises:
   generating a request, requesting set up of an Evolved Packet System (EPS) bearer between the wireless device and a Packet Gateway (PGW) in the wireless network, the request indicating a required probability of fulfilling one or more quality-of-service requirements of a service to be supported by the EPS bearer;
   sending the request to a control node in the wireless network that is associated with setting up the EPS bearer;
   receiving an indication of a relationship between the required probability of fulfilling the one or more quality-of-service requirements and an estimated probability of fulfilling the one or more quality-of-service requirements, as estimated by the wireless network for the EPS bearer; and
   setting a mode of operation of the wireless device with respect to the service, in dependence on the indicated relationship.

2. The method according to claim 1, wherein the request is one of a BEARER RESOURCE ALLOCATION REQUEST, a BEARER RESOURCE MODIFICATION REQUEST and a PDN CONNECTIVITY REQUEST.

3. The method according to claim 1, wherein the request is one of a BEARER RESOURCE ALLOCATION REQUEST and a BEARER RESOURCE MODIFICATION REQUEST, wherein the EPS bearer is a dedicated EPS bearer, and wherein the method further comprises, before the sending of the request:
   sending, to the control node, a request for setting up a default EPS bearer towards the PGW.

4. The method according to claim 1, wherein the request is a PDN CONNECTIVITY REQUEST, wherein the EPS bearer is a default EPS bearer.

5. A method performed by a radio base station operating in a wireless network, wherein the method comprises:
   receiving, from a control node in the wireless network, a request for setting parameters of an S1 bearer or an Iu bearer, to be used for supporting a service for a wireless device; and
   wherein the request is associated with a required probability of fulfilling one or more quality-of-service requirements of the service, and the method further includes the base station estimating a probability of fulfilling the one or more quality-of-service requirements of the service and indicating the estimated probability to at least one of the control node and the wireless device.

6. The method according to claim 5, wherein estimating the probability of fulfilling the one or more quality-of-service requirements is based on one or more of:
a number of connections for the wireless device; and
a quality of connections for the wireless device.

7. The method according to claim 6, wherein indicating the estimated probability comprises sending, to the second network node, a response message indicating a relationship between the required and estimated probabilities of fulfilling the one or more quality-of-service requirements.

8. The method according to claim 5, wherein the one or more quality-of-service requirements comprise a set of parameters relating to quality of the service.

9. The method according to claim 5, wherein the request is one of an S1 context setup message, an S1 bearer, or an Iu bearer modification message.

10. A method performed by a control node in a wireless network, wherein the method comprises:
receiving a request from a wireless device, for setting up an Evolved Packet System (EPS) bearer between the wireless device and a Packet Gateway (PGW) in the wireless network;
receiving, in the request or from another node in the wireless network, a required probability of fulfilling one or more quality-of-service requirements for a service to be supported by the EPS bearer;
sending, to a radio base station in the wireless network, a further request for setting parameters of an S1 bearer or Iu bearer, wherein the further request is based on the required probability of fulfilling the one or more quality-of-service requirements; and
receiving, from the radio base station, a response message that indicates an estimated probability of fulfilling the one or more quality-of-service requirements and sending a corresponding indication towards the wireless device.

11. The method according to claim 10, wherein the required probability of fulfilling the one or more quality-of-service requirements is received from one of a Home Subscriber Server (HSS), a Home Location Register (HLR), or an Authentication and Accounting (AAA) server, in the wireless network.

12. A wireless device configured for operation in a wireless network, the wireless device comprising:
communication circuitry configured for communicatively coupling the wireless device to the wireless network; and
processing circuitry operatively associated with the communication circuitry and configured to:
generate a request, requesting set up of an Evolved Packet System (EPS) bearer between the wireless device and a Packet Gateway (PGW) in the wireless network, the request indicating a required probability of fulfilling one or more quality-of-service requirements of a service to be supported by the EPS bearer;
send the request to a control node in the wireless network that is associated with setting up the EPS bearer;
receive an indication of a relationship between the required probability of fulfilling the one or more quality-of-service requirements and an estimated probability of fulfilling the one or more quality-of-service requirements, as estimated by the wireless network for the EPS bearer; and
set a mode of operation of the wireless device with respect to the service, in dependence on the indicated relationship.

13. The wireless device according to claim 12, wherein the request is one of a BEARER RESOURCE ALLOCATION REQUEST, a BEARER RESOURCE MODIFICATION REQUEST and a PDN CONNECTIVITY REQUEST.

14. The wireless device according to claim 12, wherein the request is one of a BEARER RESOURCE ALLOCATION REQUEST and a BEARER RESOURCE MODIFICATION REQUEST, wherein the EPS bearer is a dedicated EPS bearer, and wherein the processing circuitry is configured to send, to the control node, a request for setting up a default EPS bearer towards the PGW, before the request is sent.

15. The wireless device according to claim 12, wherein the request is a PDN CONNECTIVITY REQUEST, and wherein the EPS bearer is a default EPS bearer.

16. A radio base station configured for operation in a wireless network and comprising:
communication circuitry configured to communicatively couple the radio base station at least to a control node in the wireless network; and
processing circuitry operatively associated with the communication circuitry and configured to:
receive, from the control node, a request for setting parameters of an S1 bearer or an Iu bearer to be used for supporting a service for a wireless device; and
wherein the request is associated with a required probability of fulfilling one or more quality-of-service requirements of the service, and the processing circuitry is further configured to:
estimate a probability of fulfilling the one or more quality-of-service requirements; and
indicate the estimated probability of fulfilling the one or more quality-of-service requirements to at least one of the control node and the wireless device.

17. The radio base station according to claim 16, wherein the processing circuitry is configured to estimate the probability of fulfilling the one or more quality-of-service requirements based on one or more of:
a number of connections for the wireless device; and
a quality of connections for the wireless device.

18. The radio base station according to claim 17, wherein the processing circuitry is configured to indicate the estimated probability of fulfilling the one or more quality-of-service requirements by sending a response message to the control node, indicating a relationship between the required and estimated probabilities of fulfilling the one or more quality-of-service requirements.

19. The radio base station according to claim 16, wherein one or more quality of service requirements comprise a set of parameters relating to quality of the service.

20. The radio base station according to claim 16, wherein the request is one of an S1 context setup message, an Iu bearer modification message, or an S1 bearer modification message.

21. A control node configured for operation in a wireless network, the control node comprising:
communication circuitry configured for communicatively coupling the control node within the wireless network; and processing circuitry operatively associated with the communication circuitry and configured to:
- receive, from the wireless device, a request for setting up an Evolved Packet System (EPS) bearer between the wireless device and a Packet Gateway (PGW) in the wireless network;
- receive, in the request or from another node in the wireless network, a required probability of fulfilling one or more quality-of-service requirements for a service to be supported by the EPS bearer;
- send, to a radio base station in the wireless network, a further request for setting parameters of an S1 bearer or Iu bearer, wherein the further request is based on the required probability of fulfilling the one or more quality-of-service requirements; and
- receive, from the radio base station, a response message indicating an estimated probability of fulfilling the one or more quality-of-service requirements, and send a corresponding indication towards the wireless device.

22. The control node according to claim 21, wherein the required level of the connectivity is received from one of a Home Subscriber Server (HSS), a Home Location Register (HLR), or an Authentication and Accounting (AAA) server, in the wireless network.

* * * * *